United States Patent [19]

Boon

[11] Patent Number: 5,446,498
[45] Date of Patent: Aug. 29, 1995

[54] SCALING INTERLACED IMAGES FOR ENCODING AND DECODING OF DIGITAL VIDEO SIGNALS OF MULTIPLE SCANNING STANDARDS

[75] Inventor: Choong S. Boon, Moriguchi, Japan

[73] Assignee: Matsushita Electric Industrial Co., Ltd., Osaka, Japan

[21] Appl. No.: 185,244

[22] Filed: Jan. 24, 1994

[30] Foreign Application Priority Data

Jan. 22, 1993 [JP] Japan ............................ 5-008969

[51] Int. Cl.⁶ .......................... H04N 7/01; H04N 5/46
[52] U.S. Cl. ...................................... 348/448; 348/555
[58] Field of Search ............... 348/448, 554, 555, 441;
H04N 7/01, 5/46

[56] References Cited

U.S. PATENT DOCUMENTS 4,789,893  12/1988  Weston ................................. 348/448
5,067,016  11/1991  Wang .................................... 348/448

FOREIGN PATENT DOCUMENTS 2151431  12/1984  United Kingdom .......... H04N 5/14
2184628  12/1984  United Kingdom .......... H04N 5/14

OTHER PUBLICATIONS

Standards Conversion Between 1250/50 and 625/50 TV Systems, Devereux, BBC Research Department, UK, pp. 51-55.

Primary Examiner—James J. Groody
Assistant Examiner—Cheryl Cohen
Attorney, Agent, or Firm—Wenderoth, Lind & Ponack

[57] ABSTRACT

In a method of scaling interlaced video signals suitable for layered coding, an interpolation process is restricted within a frame where the interpolation of one field in a frame is derived from the same field and its opposite field in the same frame. The first field is converted to a first progressive image such that an interpolated line in the first field is formed by a weighted average of two or more adjacent lines in the first field plus a weighted average of two or more adjacent lines in the second field where one of these lines is at the same position as the interpolated line in the first field. Similarly, the second field is converted to a second progressive image such that an interpolated line in the second field is formed by a weighted average of two or more adjacent lines in the second field plus a weighted average of two or more adjacent lines in the first field where one of the lines in the first field is at the same position as the interpolated line in the second field. The first and second progressive images are then resampled vertically according to a predetermined resampling ratio m/n, where m and n are integers with n indicating the number of output samples out of m input samples. The sum of the weights for filtering the lines in the opposite field is zero.

16 Claims, 5 Drawing Sheets

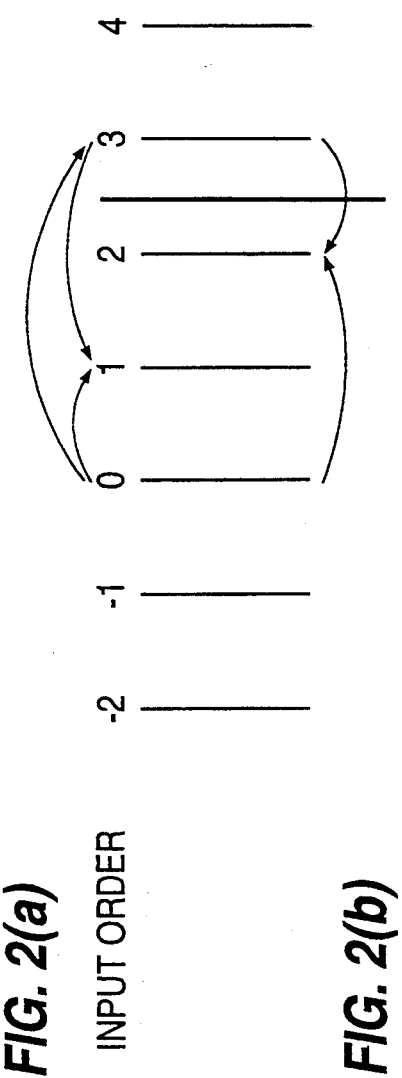
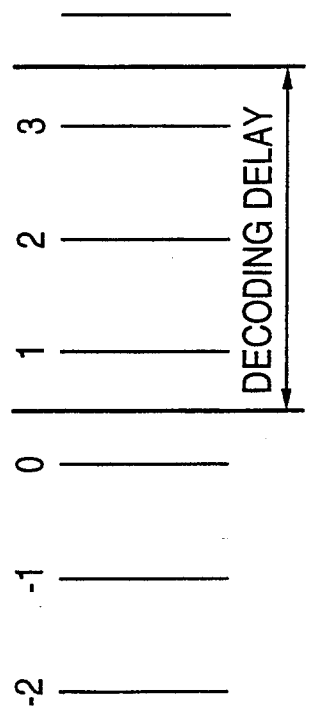
FIG. 2(a) INPUT ORDER
FIG. 2(b) ENCODING/DECODING ORDER
FIG. 2(c) DISPLAY ORDER

FIG. 3
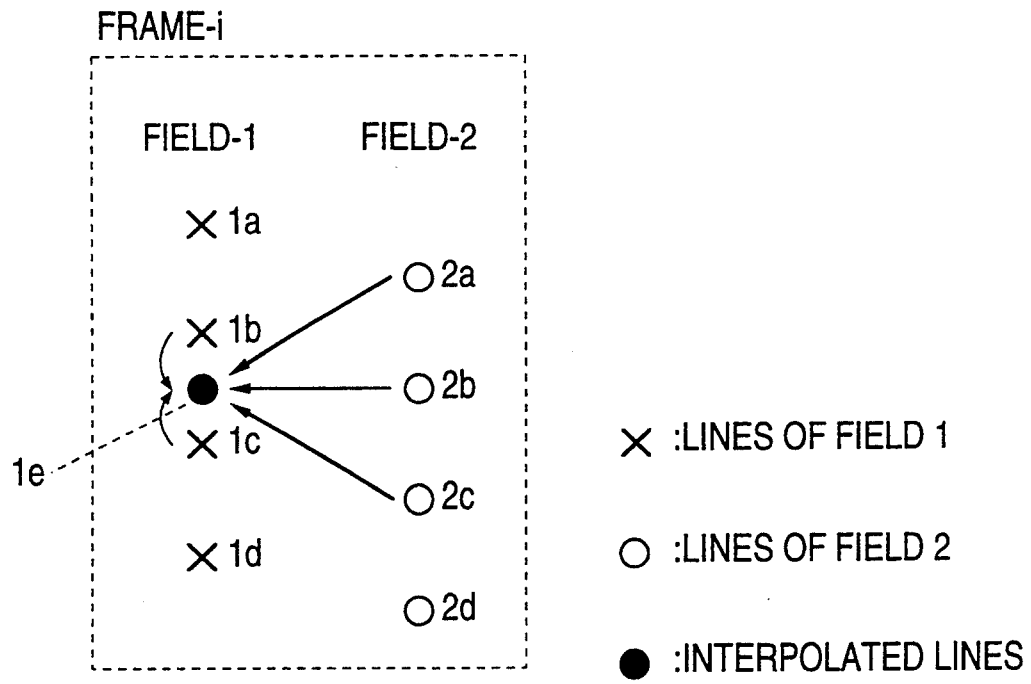
× :LINES OF FIELD 1
○ :LINES OF FIELD 2
● :INTERPOLATED LINES
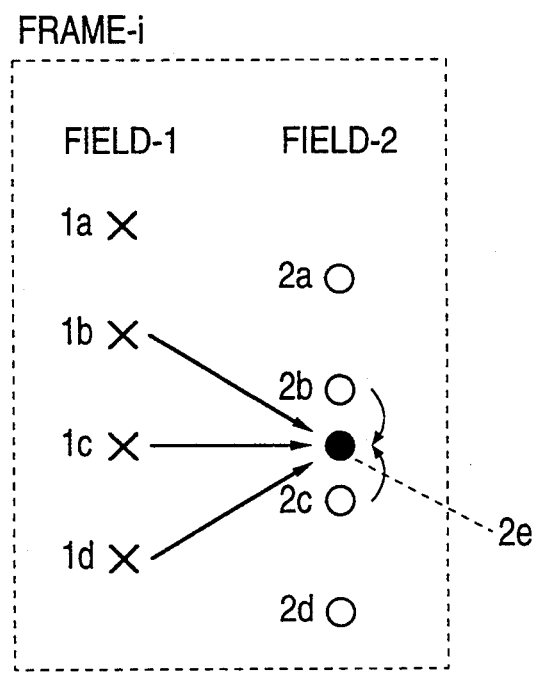

SCALING INTERLACED IMAGES FOR ENCODING AND DECODING OF DIGITAL VIDEO SIGNALS OF MULTIPLE SCANNING STANDARDS

BACKGROUND OF THE INVENTION

1. Field of the Invention

The present invention relates to the encoding and decoding of scalable digital video signals, and more particularly to a method of scaling of interlaced images for compatible encoding and decoding video signals multiple scanning standards.

2. Description of the Prior Art

Numerous picture bit rate reduction coding schemes are known for compressing digitized video signals for transmission and storage at a reduced bit rate. Activities for developing these techniques are in progress. International standards have been created, while some are still under development, by organizations like the CCITT and ISO.

New coding schemes are required to maintain compatibility with existing coding schemes while including some degree of scalability where the reconstructed video signals can have a multiplicity of spatial resolutions. When a new standard decoder is able to decode pictures from the signal of an existing standard encoder, the scheme is known to be forward compatible. On the other hand, when an existing standard decoder is able to decode pictures from the signal of a new standard encoder, the new scheme is known to be backward compatible. The demand to satisfy both the forward and backward compatibility can be achieved by layered coding.

An encoding system for layered coding essentially consists of multiple layers of encoders coupled to each other. For simplicity, the description hereafter will be concentrated on, but not limited to, a two-layer system where the low layer processes the standard TV video signals (SDTV) while the high layer processes the high definition video signals (HDTV). In an alternative system, the low and high layers may be assigned to process low definition video signals (LDTV) and SDTV signals, respectively. The encoding system receives a sequence of HDTV images which are down-converted to SDTV resolution. The low layer encoder compresses and encodes the down-converted images to produce a low layer data stream. The compressed SDTV signals are locally decoded for use as predictors for the high layer encoder and a subsequent encoding process at the same layer. At the same time, the high layer encoder compresses and encodes the original HDTV images to produce a high layer data stream. Similarly, the compressed HDTV signals are locally decoded for use as predictors for a subsequent encoding process at the same layer. Hence, there are two predictors for the high layer encoder: one comes from the same (high) layer while the other comes from the low layer. The predictor from the same (high) layer, hereafter referred to as a "temporal predictor", is a past or future decompressed picture in the display order. The predictor from the low layer, hereafter referred to as a "compatible predictor", is spatially up-converted to HDTV resolution and used for compatible prediction. Both the temporal and compatible predictors may be used separately or together in a weighted average form. Finally, the low and high layer data streams are multiplexed for transmission and/or storage.

A corresponding decoding system of a two-layer encoding system essentially consists of a low layer decoder and a high layer decoder. The transmitted signal is first demultiplexed to the low and high layer data streams. The low layer data stream is decompressed and decoded by the low layer decoder to produce reconstructed SDTV images. These reconstructed SDTV images are up-converted to HDTV resolution and used as compatible predictors for the high layer decoder. At the same time, the high layer data stream is decompressed and decoded by the high layer decoder, based on the temporal and compatible predictors, to reconstruct the HDTV images. The decoding system can, therefore, produce images at SDTV and HDTV resolutions, allowing some degree of scalability.

Efficient up- and down-conversions are crucial to the layered coding described above, especially when both the SDTV and HDTV images are interlaced. Early technologies adopted intrafield conversion methods where all the lines in an output field were derived from the lines in only one field of the input. For down-conversion, each field of the input interlaced frames is filtered and down-sampled independently, and for up-conversion, each field of the input interlaced frames is interpolated vertically from two or more lines in the same field. It is well recognized that intra-field down-conversion is inadequate for deriving interlaced lower resolution images from higher resolution interlaced source. The problem becomes even worse when the down-converted images are coded and up-converted, based on an intra-field method, and used as a compatible prediction for layered coding.

Further improvements could be achieved by employing temporal interpolation in addition to vertical interpolation, i.e., by using lines from more than one input field in deriving the lines in an output field. Temporal interpolation improves vertical definition on stationary images, but causes very noticeable impairment for scenes with fast movements. One way for solving the problem is to use adaptive system in which the temporal interpolation is used for stationary and very slowly moving scenes and the vertical interpolation is used for scenes with faster movements. An example of the adaptive method could be found in UK Patent GB 2184628.

It was later realized that a non-adaptive spatio-temporal interpolation could perform as well as the adaptive system but with less complexity because no movement detector circuitry is needed. The details of the non-adaptive spatio-temporal interpolation is found in Devereux, V.G, "Standards conversion between 1250/50 and 625/50 TV systems", IBC 92 paper. According to this method, interpolation of one field is derived from a plurality of lines in the same field and those in the adjacent fields which come immediately before and after the target field. This is illustrated in FIG. 1 in which the vertical position of lines is plotted vertically against time horizontally. In the diagram, a pel at line 1e is derived by filtering the pels at lines 1b, 1c, 2a, 2b, 2c, 3a, 3b, 3c. Similarly, a pel at line 2e is derived by filtering the pels at lines 2b, 2c, 1b, 1c, 1d, 4b, 4c, 4d. The weights for filtering the lines in the adjacent fields are always summed to zero. It is important to note that this method involves a three-field aperture filtering which extends to the neighboring frames in the display order.

A coding scheme which adopts "bi-directional prediction", however, does not process the images according to the display order. A bidirectionally predicted picture is coded by referring to both past and future pictures in the display order. The encoding/decoding order of a single layer system is illustrated in FIGS. 2(a)-2(d) in which the position of the frames, each consists of two fields, is plotted against time. In in FIG. 2(a), frames #1 and #2 are predicted from frames #0 and #3. Therefore, frame #3 has to be coded first before coding frames #1 and #2, as depicted in in FIG. 2(b). The re-ordering of the input images demands four frame memories for storing the input images and incurs a three-frame delay between the input and output of the encoder. At the decoder, the reconstructed images have to be re-ordered back to the original order for display, which incurs another three-frame delay. This is shown in case (c) in FIG. 2. When this bi-directional prediction scheme is applied to the two-layer encoding/decoding system which adopts the three-field aperture interpolation method for up- and down-conversion, the frame memories and delay will at least double. The reason comes from the fact that compatible predictors from the low layer have to be re-ordered back to the display order before the three-field aperture interpolation is applied to up-convert the predictors to HDTV resolution. The number of frame memories and delay involved will further grow as the number of layers increases.

SUMMARY OF THE INVENTION

An object of the present invention is to provide an efficient method for up- and down-conversion of interlaced images which is suitable for layered coding in the sense that the number of frame memories and delay involved are minimized to the level of a single layer system. The method is also capable of producing pictures with quality not worse than the three-field aperture method.

According to the present invention, a spatio-temporal interpolation is restricted within a frame where the interpolation of one field in a frame is derived from the opposite field in the same frame. This eliminates the necessity of re-ordering the compatible predictors from the low layer back to the display order when up-converting the predictors to a higher resolution. The number of frame memories and delay involved, thus, can be reduced drastically. At a minimum, the system only needs the same number of frame memories and incurs the same delay time as a single layer system. When applied to normal pictures, the quality of the converted pictures was discovered to be not worse than that of the three-field aperture method.

More specifically, an interlaced image which consists of a first and a second field of each frame is scaled according to the following steps. The first field of each frame is converted to a first progressive image in such a manner that an interpolated line in the first field is formed by an weighted average of two or more adjacent lines in the first field plus an weighted average of two or more adjacent lines in the second field where one of the lines in the second field is at the same position, the interpolated line in the first field of each frame. Similarly, the second field is converted to a second progressive image in such a manner that an interpolated line in the second field is formed by an weighted average of two or more adjacent lines in the second field plus an weighted average of two or more adjacent lines in the first field where one of the lines in the first field is at the same position as the interpolated line in the second field. The first and second progressive images are then resampled vertically according to a predetermined resampling ratio m/n, where m and n are integers with n indicating the number of output samples out of m input samples.

In a preferred manner, when interpolating the first field, the weights for averaging the lines in the second field are summed to zero and when interpolating the second field, the weights for averaging the lines in the first field are also summed to zero. In another preferred manner, the first and second progressive images are filtered to a predetermined bandwidth prior to resampling.

The features and advantages of the invention would be gathered from the following non-limitative, illustrative description made with reference to the attached drawings.

BRIEF DESCRIPTION OF THE DRAWINGS

FIGS. 2(a)-2(c) respectively illustrate input order, encoding/decoding order and display order of a reconstructed image.

FIG. 3 illustrates a method of deriving a progressive image from an interlaced video signal in accordance with the present invention.

DESCRIPTION OF THE PREFERRED EMBODIMENTS

FIG. 3 illustrates a diagram showing a method of deriving a progressive image from an interlaced video signal in accordance with the present invention. In the diagram, the vertical position of each line is plotted vertically against time horizontally. It is important to note that fields 1 and 2 constitute the same frame. In the figure, a pel in field 1, for example $1e$, can be interpolated in the following manner:

$$1e = w4 \times 1b + w2 \times 1c + w5 \times 2a + w3 \times 2b + w1 \times 2c,$$

where w1, w2, ..., w5 are weights of a desired filter characteristic. Preferably, the weights for field 2 satisfy the following condition:

$$w1 + w3 + w5 = 0.$$

An example set of the weights may be as follows:

$$w2 = w4 = \tfrac{1}{2},$$

$$w3 = \tfrac{1}{2},$$

$$w3 = w5 = -\tfrac{1}{4}.$$

Next, a pel in field 2, for example 2e, can be interpolated in the similar manner as follows:

$$2e = w4' \times 2b + w2' \times 2c + w5' \times 1b + w3' \times 1c + w1' \times 1\text{-}d,$$

where weights w1', w2', ..., w5' may have the same values as w1, w2, ..., w5, respectively, or other values characterizing a different filter response. Complex filters with more weights can be adopted for better performance. Thus, the two fields can be interpolated by spatio-temporal filtering without referring to fields from other frames.

Figure 1:
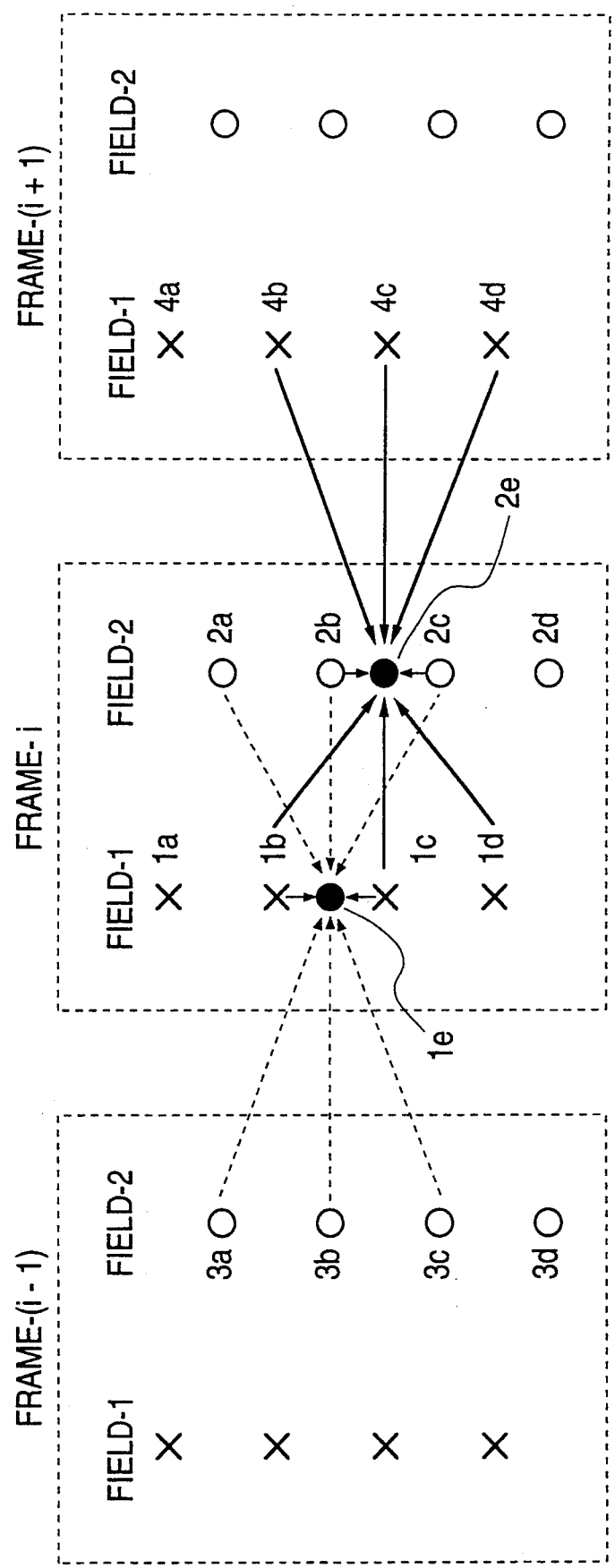
FIG. 1 illustrates a prior art method for deriving a progressive image from an interlaced video signal by means of a diagram showing vertical positions plotted against time.
Figure 4:
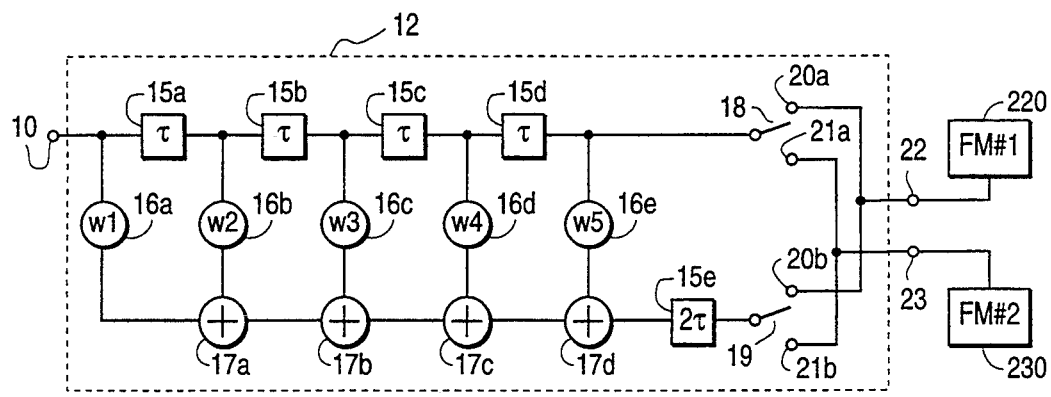
FIG. 4 is a block diagram of an embodiment for deriving a progressive image from an interlaced video signal in accordance with the present invention.

A block diagram of a preferred embodiment of an interpolator in accordance with the present invention is shown in FIG. 4. This interpolator 12 is constituted by a transversal filter with switches 18 and 19 at the output ends, enabling alternative interpolation of fields 1 and 2. The example shows a five-tap filter constituted by buffers 15a–15d for delay, multiplying circuits 16a–16e for weighting and adders 17a–17d, but may be extended at need. The input pels are fed through an input terminal 10. For consistency with FIG. 3, let the input pels be 2a, 1b, 2b, 1c, 2c, 1d and are fed into the interpolator in the given order at 0 second. Each pel moves across the filter every $\tau$ seconds, is multiplied by a corresponding weight (w1, w2, ..., w5) and summed by a corresponding adder (17a, 17b, ..., 17d). At 4$\tau$ second, let the switch 18 be connected to its terminal 21a and the switch 19 be connected to its terminal 20b. At this instant, pels 2a and 1e (interpolated pel in FIG. 3) emerge from the filter. Pel 2a is outputted to an output terminal 23 which is connected to a frame memory #2 (FM#2) 230. The interpolated pel 1e is stored in a buffer 15e and delayed by 2$\tau$ seconds. At 5$\tau$ second, the switch 18 is connected to its terminal 20a and the switch 19 is connected to its terminal 21b. At this instant, pels 1b and 2e (interpolated pel in FIG. 3) emerge from the filter. Pel 1b is outputted to an output terminal 22 which is connected to a frame memory #1 (FM#1) 220. The interpolated pel 2e is stored in the buffer 15e and delayed by 2$\tau$ seconds. At 6$\tau$ second, the switch 18 is connected to the terminal 21a and the switch 19 is connected to the terminal 20b. At this instant, pel 2b is outputted to through the output terminal 23 to the frame memory #2 and pel 1e is outputted through the output terminal 22 to the frame memory #1. At the next instant, pel 1c is outputted to the frame memory #1 and pel 2e is outputted to the frame memory #2, and so on. In this manner, an interpolated image of field 1 is stored in the frame memory #1 while an interpolated image of field 2 is stored in the frame memory #2. Fields 1 and 2, therefore, can be interpolated alternatively by using only one transversal filter. The interpolator can also be used for interpolating images horizontally as well as performing low/high pass filtering by fixing the switches 18 and 19 to appropriate output terminals and setting the weights to appropriate values.

Figure 5:
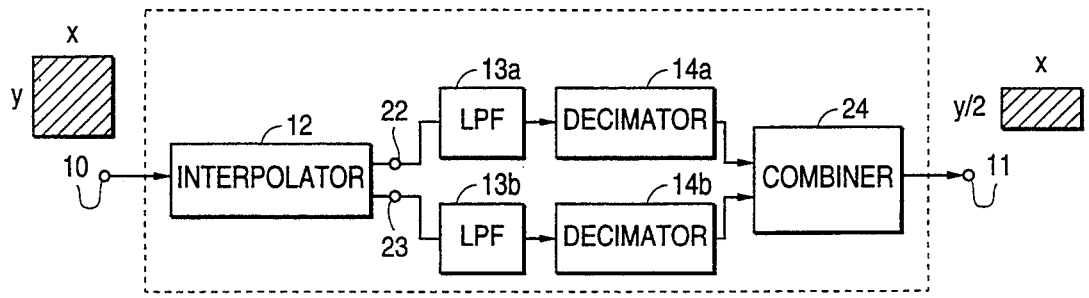
FIG. 5 is a block diagram of an embodiment of a vertical down-converter in accordance with the present invention.

A block diagram of a preferred embodiment of a vertical down-converter in accordance with the present invention is shown in FIG. 5. An interlaced image, or a portion of the image, of size x times y is fed through an input terminal 10. Each field of the input image is interpolated in an interpolator 12 which may be the same as the interpolator described above. The interpolated images are then fed into low pass filters (LPF) 13a and 13b respectively for limiting the bandwidth of the signals. Next, the filtered images are sub-sampled in decimators 14a and 14b, respectively, according to a predetermined resampling ratio m/n, where m and n are integers with n indicating the number of output samples out of m input samples. An example of m/n may be 2/1, which implies that every other lines of the input image be outputted. The lines of the resampled images are then merged alternately by a combiner 24 to produce a vertically down-converted interlaced image of size x times y/2 at an output terminal 11. The vertically down-converted image may be subsequently fed into a horizontal down-converter. Alternatively, the original image may be horizontally down-converted before down-converting vertically.

Figure 6:
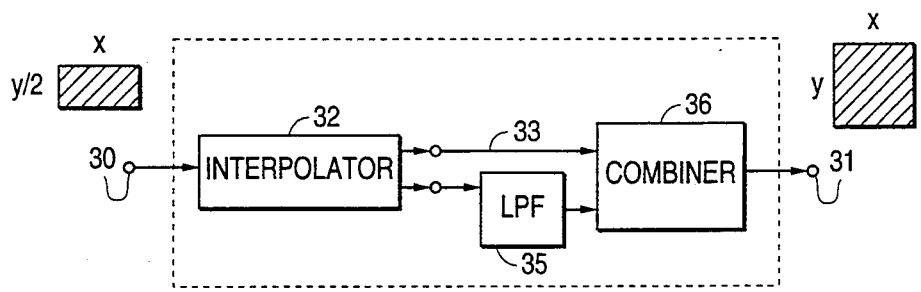
FIG. 6 is a block diagram of an embodiment of a vertical up-converter in accordance with the present invention.

FIG. 6 is a block diagram of a preferred embodiment of a vertical up-converter in accordance with the present invention. An interlaced image, or a portion of the image, of size x times y/2 is fed through an input terminal 30. Each field of the input image is interpolated in an interpolator 32 which may be the same as the interpolator depicted in FIG. 4. Outputs of the interpolator 32 are progressive images of fields 1 and 2. One of the progressive images, usually field 1, is fed directly via a line 33 to a combiner 36. The other progressive image, usually field 2, is filtered by a low pass filter (LPF) 35 for shifting the lines of field 2 to the correct phase. Finally, the combiner 36 merges the lines of the two progressive images to produce an interlaced image of size x times y at an output terminal 31. The example in FIG. 6 assumed an input image which has been horizontally interpolated. Alternatively, the horizontal interpolation may be carried out after the vertical interpolation.

Figure 7:
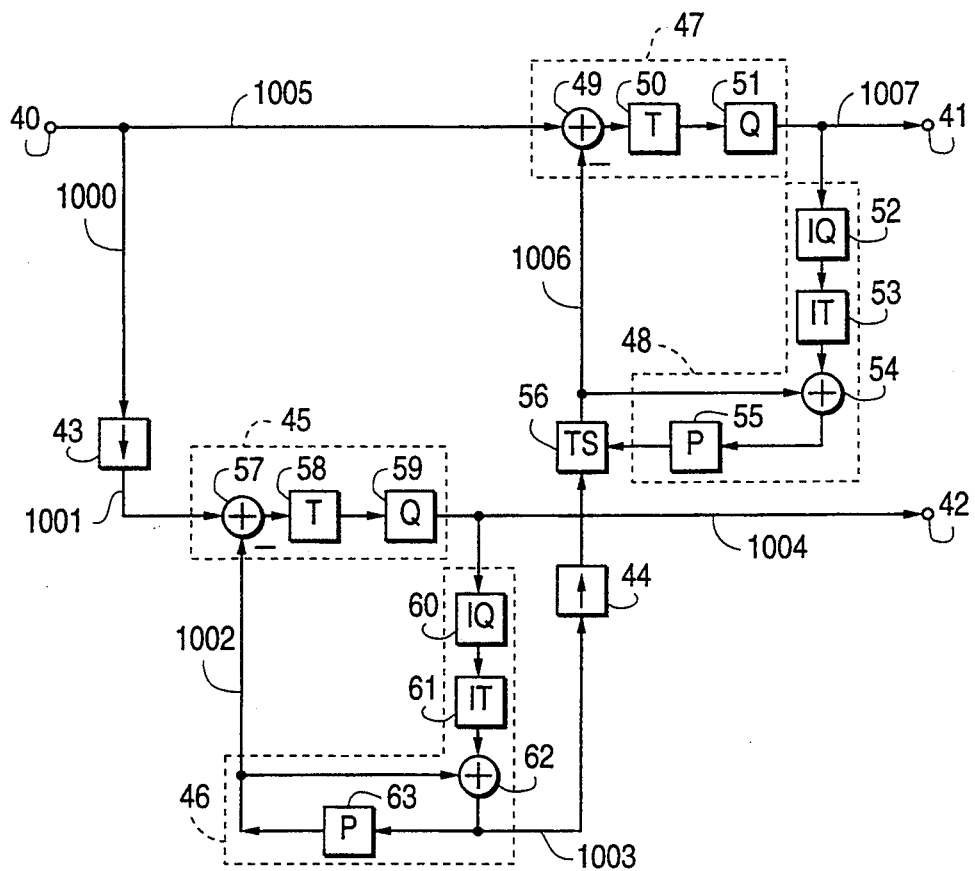
FIG. 7 is a block diagram of an embodiment of an encoding apparatus utilizing the down-converter and up-converter in accordance with the present invention.

A block diagram of a preferred embodiment of a two-layer encoding apparatus utilizing the down-converter and up-converter in accordance with the present invention is shown in FIG. 7. The description will be concentrated on, but not limited to, HDTV and SDTV signals. Video signals of other resolution are equally applicable. An original interlaced HDTV picture inputted through an input terminal 40 is fed through a line 1000 into a down-converter 43 where it is down-converted in both horizontal and vertical directions. The vertical down-converter shown in FIG. 5 may be used in the down-converter 43. The down-converted interlaced picture is fed through a line 1001 into a first encoder 45 where it is divided into a plurality of blocks each containing a matrix of pixel data. In the present embodiment, each block is of size 8×8 pixels. In the first encoder 45, a subtractor 57 receives a current block at one input thereof and a predicted block derived from one or more previously coded pictures at the other input thereof and produces a difference signal between the current block and the predicted block. An output of the subtractor 57, i.e., the difference signal, is then transformed in a transformation circuit (T) 58 and quantized by a quantizer (Q) 59. The transformation circuit 58 may perform one of the discrete cosine transform (DCT), the HADAMARD transform and the HAAR transform, which are most widely used. The quantized data and other side information are combined to produce a low layer data stream which is outputted through a line 1004 and an output terminal 42. At the same time, the quantized data is fed to a first local decoder 46. In the first local decoder 46, the quantized data is dequantized by a dequantizer (IQ) 60 and inverse transformed by an inverse transformation circuit (IT) 61. At an adder 62, the predicted block is added back to the decompressed data from the inverse transformation circuit 61 to produce a reconstructed block. The reconstructed block is sent to an up-converter 44 via a line 1003. In the up-converter 44, the reconstructed block is up-converted both horizontally and vertically. The vertical up-converter shown in FIG. 6 may be used in the up-converter 44. The up-converted block is used as a spatial predictor for encoding the original block at HDTV resolution. Reconstructed blocks from the adder 62 are stored in a set of frame memories (P) 63. A reconstructed block is retrieved responsive to some motion signals as a predictor for subsequent encoding, which is fed to the subtractor 57 via a line 1002 and to the adder 62.

At the same time, the original interlaced HDTV picture is fed also into a second encoder 47 via a line 1005 and divided into a plurality of blocks. A difference signal is created by a subtractor 49 from the current block and a predicted block, transformed by a transformation circuit (T) 50, and quantized by a quantizer (Q) 51 similarly to the processing in the first encoder 46. The quantized data and other side information are combined to produce a high layer data stream which is outputted through a line 1007 and an output terminal 41. In a second local decoder 48, the quantized data from the second encoder 47 are dequantized by a dequantizer (IQ) 52 and inverse transformed by an inverse transformation circuit (IT) 53. At an adder 54, the predicted block is added back to the decompressed data from the inverse transformation circuit 53 to produce a reconstructed block. Reconstructed blocks from the adder 54 are stored in a set of frame memories (P) 55. A reconstructed block is retrieved responsive to some motion signals as a temporal predictor for the subsequent encoding. A temporal predictor block retrieved from the set of frame memories 55 and a spatial predictor from the up-converter 44 are averaged at an averaging circuit (TS) 56 to produce a spatio-temporal predictor. The spatio-temporal predictor is sent via a line 1006 to the subtractor 49 to be subtracted from the current block and to the adder 54 to be added to the decompressed data from the inverse transformation circuit 53. There may exist several candidate sets of weights for averaging the spatio-temporal predictor. An optimum set may be selected adaptively according to a predetermined criterion such as least mean square. The optimum weights are transmitted in the high layer data stream.

Figure 8:
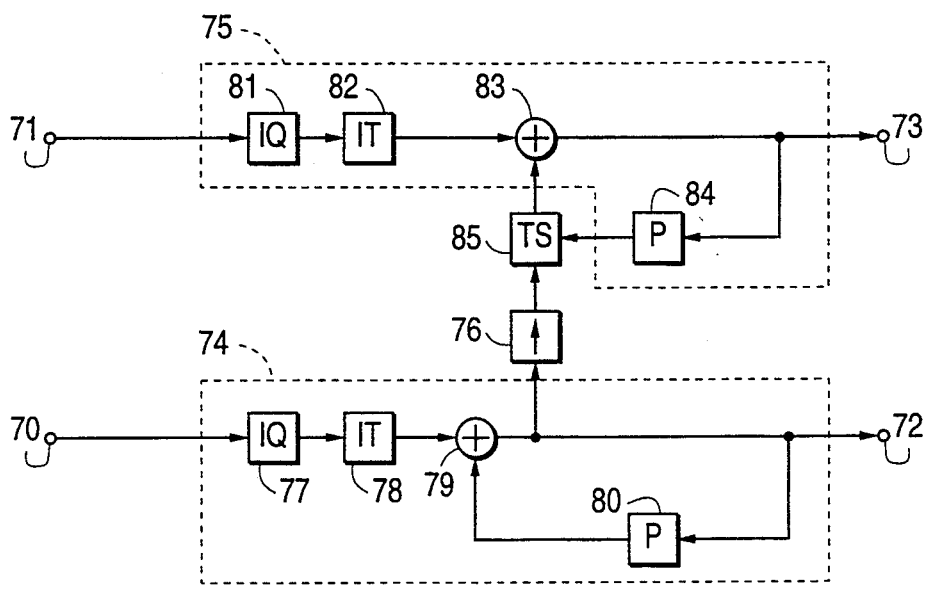
FIG. 8 is a block diagram of an embodiment of a decoding apparatus utilizing the up-converter in accordance with the present invention.

A preferred embodiment of a corresponding decoding apparatus according to the present invention is shown in FIG. 8. The low layer data stream is fed into a first decoder 74 through an input terminal 70. The low layer data stream is dequantized by a dequantizer (IQ) 77 and inverse transformed by an inverse transformation circuit (IT) 78. At an adder 79, a predicted block retrieved from a set of frame memories (P) 80 as specified in the low layer data stream is added to the inverse transformed block to form a reconstructed block which is outputted from an output terminal 72. Reconstructed blocks from the adder 79 are stored in the set of frame memories (P) 80. The reconstructed block is also sent to an up-converter 76 where it is up-converted both horizontally and vertically. The vertical up-converter shown in FIG. 6 may be used in the up-converter 76. The up-converted block is used as a spatial predictor for decoding the high layer data stream. A reconstructed block is retrieved as indicated in the low layer data stream as a predictor for subsequent decoding.

At the same time, the high layer data stream is fed into a second decoder 75 through an input terminal 71. The high layer data stream is dequantized by a dequantizer (IQ) 81 and inverse transformed by an inverse transformation circuit (IT) 82. At an averaging circuit 85, a spatio-temporal predictor is derived from a temporal predictor retrieved from a set of frame memories (P) 84 and a spatial predictor from the up-converter 76, as specified in the high layer data stream. The spatio-temporal predictor is added to the inverse transformed block at an adder 83 to form a reconstructed block which is outputted from an output terminal 73. Reconstructed blocks from the adder 83 are stored in the set of frame memories (P) 84.

Although the invention has been described in connection with preferred embodiments thereof, those skilled in the art would appreciate that numerous modifications and adaptations may be made thereto without departing from the spirit and scope of the invention as set forth in the appended claims.

What is claimed is:

1. A method of scaling an interlaced image each frame of which consists of a first field and a second field, comprising the steps of:
    converting said first field of each frame to a first progressive image such that an interpolated line in said first field is formed by a weighted average of two or more adjacent lines in said first field plus a weighted average of two or more adjacent lines in said second field in which one of said two or more adjacent lines in said second field is at the same position as said interpolated line in said first field;
    converting said second field of each frame to a second progressive image such that an interpolated line in said second field is formed by a weighted average of two or more adjacent line in said second field plus a weighted average of two or more adjacent lines in said first field in which one of said two or more adjacent lines in said first field is at the same position as said interpolated line in said second field; and
    resampling said first and second progressive images vertically according to a predetermined resampling ratio m/n, where m and n are integers, with n indicating the number of output samples out of m input samples.

2. A method according to claim 1, further comprising a step of filtering each of said first and second progressive images to a predetermined bandwidth prior to the resampling step.

3. A method according to claim 1, wherein a sum of the weights for averaging said two or more adjacent lines in said second field is zero when interpolating said first field, and a sum of the weights for averaging said two or more adjacent lines in said first field is zero when interpolating said second field.

4. A method according to claim 3, further comprising a step of filtering each of said first and second progressive images to a predetermined bandwidth prior to the resampling step.

5. An apparatus for scaling an interlaced image each frame of which consists of a first field and a second field, comprising:
    an interpolator, said interpolator vertically converting said first and second fields of each frame to first and second progressive images, respectively, such that an interpolated line in said first field is formed by a weighted average of two or more adjacent lines in said first field plus a weighted average of two or more adjacent lines in said second field in which one of said two or more adjacent lines in said second field is at the same position as said interpolated line in said first field and that an interpolated line in said second field is formed by a weighted average of two or more adjacent lines in said second field plus a weighted average of two or more adjacent lines in said first field in which one of said two or more adjacent lines in said first field is at the same position as said interpolated line in said second field;

a filter coupled to said interpolator, said filter filtering each of said first and second progressive images to a predetermined bandwidth; and a resampler coupled to said filter, said resampler resampling the filtered said first and second progressive images in a vertical direction according to a predetermined resampling ratio m/n, where m and n are integers, with n indicating the number of output samples out of m input samples.

6. An apparatus for scaling an interlaced image each frame of which consists of a first field and a second field, comprising:

an interpolator, said interpolator vertically converting said first and second fields of each frame to first and second progressive images, respectively, such that an interpolated line in said first field is formed by a weighted average of two or more adjacent lines in said first field plus a weighted average of two or more adjacent lines in said second field in which one of said two or more adjacent lines in said second field is at the same position as said interpolated line in said first field and that an interpolated line in said second field is formed by a weighted average of two or more adjacent lines in said second field plus a weighted average of two or more adjacent lines in said first field in which one of said two or more adjacent lines in said first field is at the same position as said interpolated line in said second field; and a filter coupled to said interpolator, said filter shifting the lines of one of said first and second progressive images to a predetermined phase position.

7. An apparatus for encoding digital video signal of different scanning standards, comprising:

a down-converter, said down-converter vertically and horizontally down-converting an input interlaced frame which consists of a first field and a second field to a first converted frame, including a vertical down-converter which comprises:

a first interpolator, said first interpolator vertically converting said first and second fields of said input interlaced frame to first and second progressive images, respectively, such that an interpolated line in said first field is formed by a weighted average of two or more adjacent lines in said first field plus a weighted average of two or more adjacent lines in said second field in which one of said two or more adjacent lines in said second field is at the same position as said interpolated line in said first field and that an interpolated line in said second field is formed by a weighted average of two or more adjacent lines in said second field plus a weighted average of two or more adjacent lines in said first field in which one of said two or more adjacent lines in said first field is at the same position as said interpolated line in said second field;

a first filter coupled to said first interpolator, said first filter filtering each of said first and second progressive images to a predetermined bandwidth; and a resampler coupled to said first filter, said resampler resampling the filtered said first and second progressive images in a vertical direction according to a predetermined resampling ratio m/n greater than one, where m and n are integers, with n indicating the number of output samples out of m input samples;

a first encoder connected to said down-converter, said first encoder compressing and encoding said first converted frame;

a first local decoder connected to said first encoder, said first local decoder decoding and decompressing an output of said first encoder to produce a first reconstructed frame which consists of a first reconstructed field and a second reconstructed field, for storing said first reconstructed frame, and for feeding a selected signal from said first reconstructed frame to said first encoder for a subsequent encoding process;

an up-converter connected to said first local decoder, said up-converter vertically and horizontally up-converting said first reconstructed frame to a second converted frame of the same size as said input interlaced frame, including a vertical up-converter which comprises:

a second interpolator, said second interpolator vertically converting said first and second reconstructed fields of said first reconstructed frame to first and second reconstructed progressive images, respectively, such that an interpolated line in said first reconstructed field is formed by a weighted average of two or more adjacent lines in said first reconstructed field plus a weighted average of two or more adjacent lines in said second reconstructed field in which one of said two or more adjacent lines in said second reconstructed field is at the same position as said interpolated line in said first reconstructed field and that an interpolated line in said second reconstructed field is formed by a weighted average of two or more adjacent lines in said second reconstructed field plus a weighted average of two or more adjacent lines in said first reconstructed field in which one of said two or more adjacent lines in said first reconstructed field is at the same position as said interpolated line in said second reconstructed field; and a second filter coupled to said second interpolator, said second filter shifting the lines of said first and second reconstructed progressive images to a predetermined phase position;

a second encoder, said second encoder compressing and encoding said input interlaced frame;

a second local decoder connected to said second encoder, said second local decoder decoding and decompressing an output of said second encoder to produce a second reconstructed frame, and for storing said second reconstructed frame for a subsequent encoding process;

an averager connected to said second encoder, said second decoder and said up-converter, said averager averaging signals selected from said second converted frame and said second reconstructed frame to produce a spatio-temporal predictor, and for feeding said spatio-temporal predictor to said second encoder and said second decoder.

8. An apparatus for decoding digital video signal of different scanning standards, comprising:
   a first decoder, said first decoder decoding and decompressing a first compressed frame to which consists of a first field and a second field to produce a first reconstructed frame, and for storing said first reconstructed frame as predictors for subsequent decoding process;
   an up-converter connected to said first decoder, said up-converter vertically and horizontally up-converting said first reconstructed frame to a converted frame including a vertical up-converter which comprises:
      an interpolator, said interpolator vertically converting said first and second fields of said first reconstructed frame to first and second progressive images, respectively, such that an interpolated line in said first field is formed by a weighted average of two or more adjacent lines in said first field plus a weighted average of two or more adjacent lines in said second field in which one of said two or more adjacent lines in said second field is at the same position as said interpolated line in said first field and that an interpolated line in said second field is formed by a weighted average of two or more adjacent lines in said second field plus a weighted average of two or more adjacent lines in said first field in which one of said two or more adjacent lines in said first field is at the same position as said interpolated line in said second field; and
      a filter coupled to said interpolator, said filter shifting the lines of one of said first and second progressive images to a predetermined phase position;
   a second decoder, said second decoder decoding and compressing a second compressed frame to produce a second reconstructed frame, and for storing said second reconstructed frame as predictors for subsequent decoding process;
   an averager connected to said second decoder and said up-converter, said averager averaging signals selected from said converted frame and said second reconstructed frame to produce a spatio-temporal predictor, and for feeding said spatio-temporal predictor to said second decoder.

9. A method of scaling an interlaced image each frame of which consists of a first field and a second field, comprising the steps of:
   converting said first field of said each frame to a first progressive image such that an interpolated line in said first field is formed by a weighted average of two or more adjacent lines in said first field plus a weighted average of two or more adjacent lines in said second field;
   converting said second field of said each frame to a second progressive image such that an interpolated line in said second field is formed by a weighted average of two or more adjacent lines in said second field plus a weighted average of two or more adjacent lines in said first field; and
   resampling said first and second progressive images vertically according to a predetermined resampling ratio m/n, where m and n are integers, with n indicating the number of output samples out of m input samples.

10. A method according to claim 9, further comprising a step of filtering each of said first and second progressive images to a predetermined bandwidth prior to the resampling step.

11. A method according to claim 9, wherein a sum of the weights for averaging said two or more adjacent lines in said second field is zero when interpolating said first field, and a sum of the weights for averaging said two or more adjacent lines in said first field is zero when interpolating said second field.

12. A method according to claim 11, further comprising a step of filtering each of said first and second progressive images to a predetermined bandwidth prior to the resampling step.

13. An apparatus for scaling an interlaced image each frame of which consists of a first field and a second field, comprising:
   an interpolator, said interpolator vertically converting said first and second fields of said each frame to first and second progressive images, respectively, such that an interpolated line in said first field is formed by a weighted average of two or more adjacent lines in said first field plus a weighted average of two or more adjacent lines in said second field and that an interpolated line in said second field is formed by a weighted average of two or more adjacent lines in said second field plus a weighted average of two or more adjacent lines in said first field;
   a filter coupled to said interpolator, said filter filtering each of said first and second progressive images to a predetermined bandwidth; and
   a resampler coupled to said filter, said resampler resampling the filtered said first and second progressive images in a vertical direction according to a predetermined resampling ratio m/n, where m and n are integers, with n indicating the number of output samples out of m input samples.

14. An apparatus for scaling an interlaced image each frame of which consists of a first field and a second field, comprising:
   an interpolator, said interpolator vertically converting said first and second fields of said each frame to first and second progressive images, respectively, such that an interpolated line in said first field is formed by a weighted average of two or more adjacent lines in said first field plus a weighted average of two or more adjacent lines in said second field and that an interpolated line in said second field is formed by a weighted average of two or more adjacent lines in said second field plus a weighted average of two or more adjacent lines in said first field; and
   a filter coupled to said interpolator, said filter shifting the lines of one of said first and second progressive images to a predetermined phase position.

15. An apparatus for encoding digital video signals of different scanning standards, comprising:
   a down-converter, said down-converter vertically and horizontally down-converting an input interlaced frame which consists of a first field and a second field to a first converted frame, including a vertical down-converter which comprises:
      a first interpolator, said interpolator vertically converting said first and second fields of said input interlaced frame to first and second progressive images, respectively, such that an interpolated line in said first field is formed by a weighted average of two or more adjacent lines in said first field plus a weighted average of two or more adjacent lines in said second field and that an interpolated line in said second field is formed by a weighted average of two or more adjacent lines in said second field plus a weighted average of two or more adjacent lines in said first field;

a first filter coupled to said interpolator, said first filter filtering each of said first and second progressive images to a predetermined bandwidth; and a resampler coupled to said first filter, said resampler resampling the filtered first and second progressive images in a vertical direction according to a predetermined resampling ratio m/n greater than one, where m and n are integers, with n indicating the number of output samples out of m input samples;

a first encoder connected to said down-converter, said first encoder compressing and encoding said first converted frame;

a first local decoder connected to said first encoder, said first local decoder decoding and decompressing an output of said first encoder to produce a first reconstructed frame which consists of a first reconstructed field and a second reconstructed field, for storing said first reconstructed frame, and for feeding a selected signal from said first reconstructed frame to said first encoder for a subsequent encoding process;

an up-converter connected to said first local decoder, said up-converter vertically and horizontally up-converting said first reconstructed frame to a second converted frame of the same size as said input interlaced frame, including a vertical up-converter which comprises:

a second interpolator, said second interpolator vertically converting said first and second reconstructed fields of said first reconstructed frame to first and second reconstructed progressive images, respectively, such that an interpolated line in said first reconstructed field is formed by a weighted average of two or more adjacent lines in said first reconstructed field plus a weighted average of two or more adjacent lines in said second reconstructed field and that an interpolated line in said second reconstructed field is formed by a weighted average of two or more adjacent lines in said second reconstructed field plus a weighted average of two or more adjacent lines in said first reconstructed field; and a second filter coupled to said second interpolator, said second filter shifting the lines of one of said first and second reconstructed progressive images to a predetermined phase position;

a second encoder, said second encoder compressing and decoding said input interlaced frame;

a second local decoder connected to said second encoder, said second local decoder decoding and decompressing an output of said second encoder to produce a second reconstructed frame, and for storing said second reconstructed frame for a subsequent encoding process;

an averager connected to said second encoder, said second decoder and said up-converter, said averager averaging signals selected from said second converted frame and said second reconstructed frame to produce a spatio-temporal predictor, and for feeding said spatio-temporal predictor to said second encoder and said second decoder.

16. An apparatus for decoding digital video signal of different scanning standards, comprising:

a first decoder, said first decoder decoding and decompressing a first compressed frame which consists of a first field and a second field to produce a first reconstructed frame, and for storing said first reconstructed frame as predictors for subsequent decoding process;

an up-converter connected to said first decoder, said up-converter vertically and horizontally up-converting said first reconstructed frame to a converted frame including a vertical up-converter which comprises:

an interpolator, said interpolator vertically converting said first and second fields of said first reconstructed frame to first and second progressive images, respectively, such that an interpolated line in said first field is formed by a weighted average of two or more adjacent lines in said first field plus a weighted average of two or more adjacent lines in said second field and that an interpolated line in said second field is formed by a weighted average of two or more adjacent lines in said second field plus a weighted average of two or more adjacent lines in said first field; and a filter coupled to said interpolator, said filter shifting the lines of one of said first and second progressive images to a predetermined phase position;

a second decoder, said second decoder decoding and compressing a second compressed frame to produce a second reconstructed frame, and for storing said second reconstructed frame as predictors for subsequent decoding process;

an averager connected to said second decoder and said up-converter, said averager averaging signals selected from said converted frame and said second reconstructed frame to produce a spatio-temporal predictor, and for feeding said spatio-temporal predictor to said second decoder.

* * * * *